No. 838,604. PATENTED DEC. 18, 1906.
W. B. BARD.
GEARING FOR MOTOR VEHICLES.
APPLICATION FILED OCT. 25, 1905.
2 SHEETS—SHEET 1.
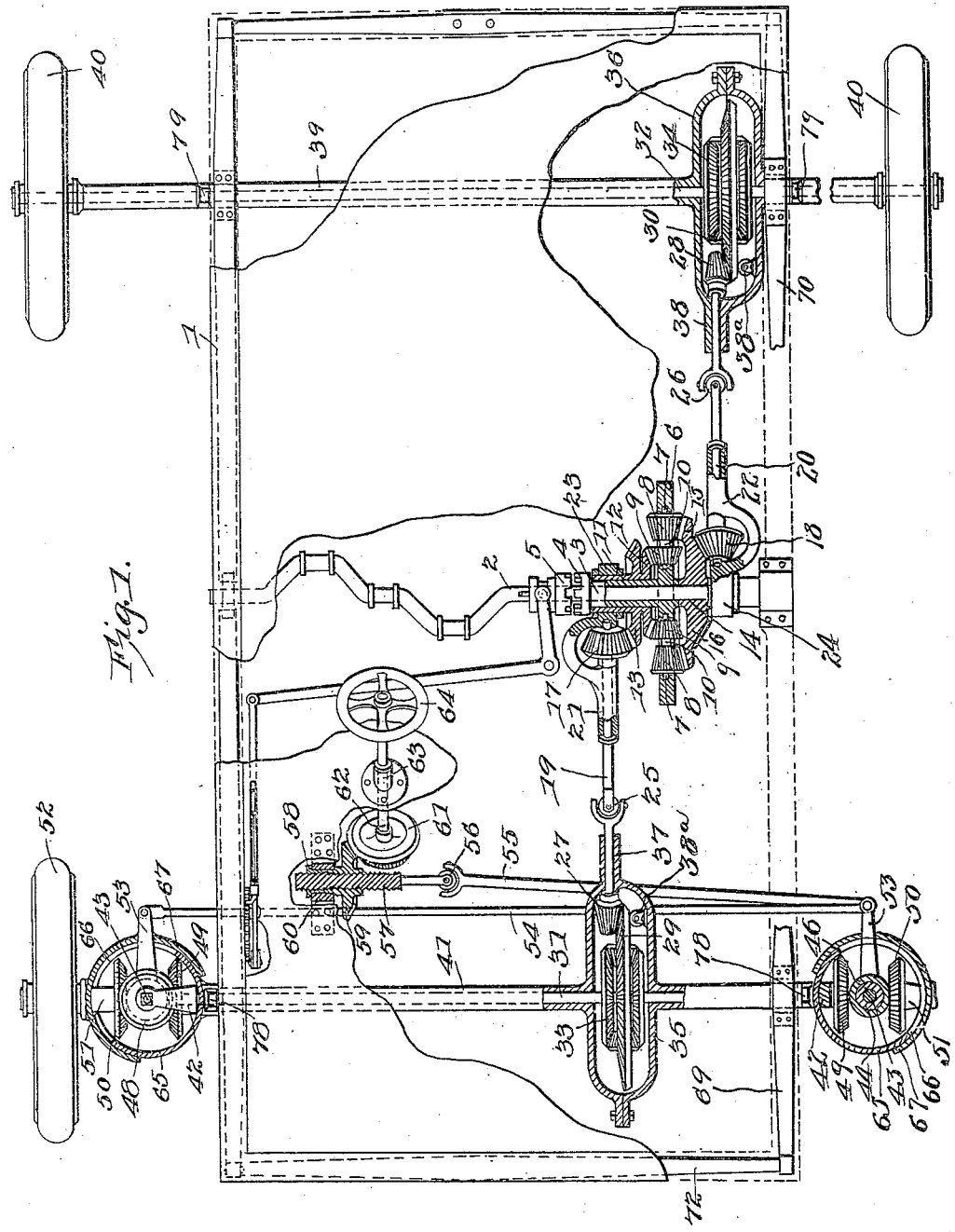
Witnesses
William B. Bard, Inventor.
by
Attorneys No. 838,604. PATENTED DEC. 18, 1906.
W. B. BARD.
GEARING FOR MOTOR VEHICLES.
APPLICATION FILED OCT. 25, 1905.
2 SHEETS—SHEET 2.
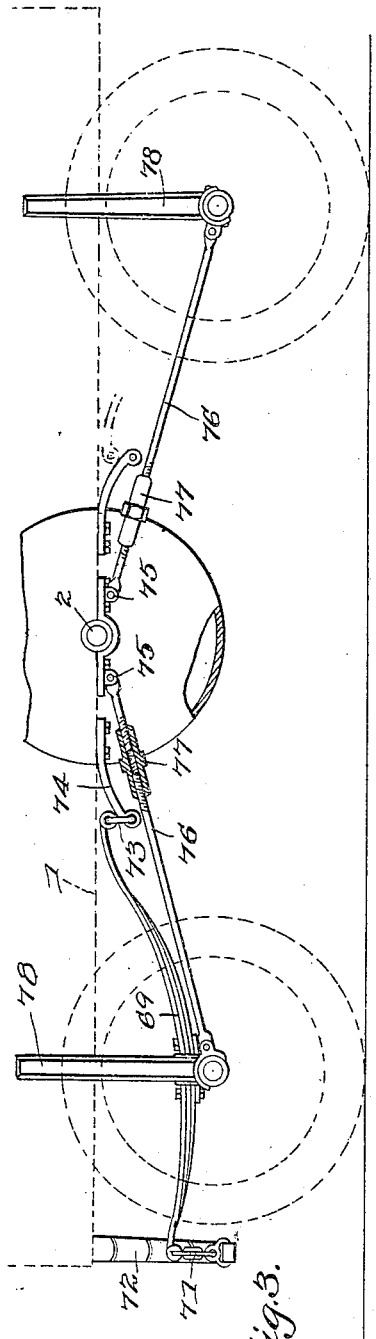
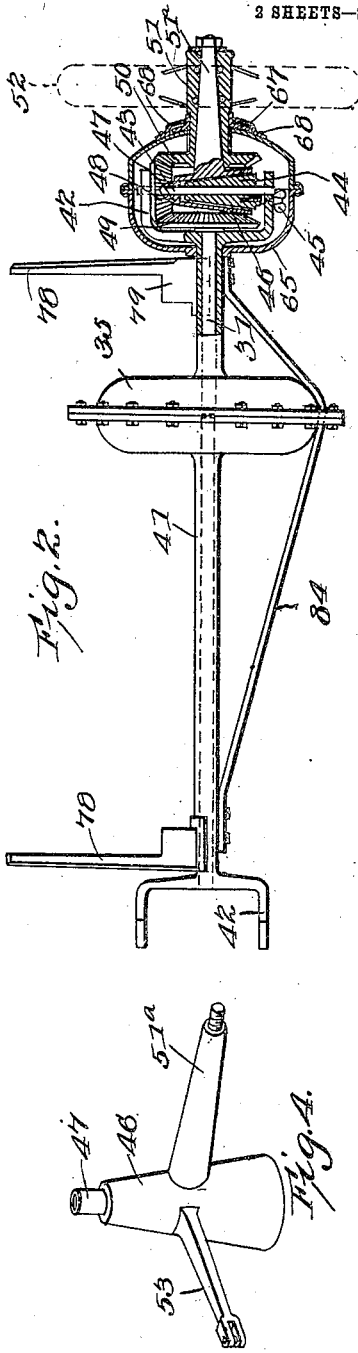
Witnesses
William B. Bard, Inventor
by
Attorneys

UNITED STATES PATENT OFFICE.

WILLIAM B. BARD, OF HIGH SPIRE, PENNSYLVANIA.

GEARING FOR MOTOR-VEHICLES.

No. 838,604.  Specification of Letters Patent.  Patented Dec. 18, 1906.

Application filed October 25, 1905. Serial No. 284,397.

*To all whom it may concern:*

Be it known that I, WILLIAM B. BARD, a citizen of the United States, residing at High Spire, in the county of Dauphin and State of Pennsylvania, have invented a new and useful Gearing for Motor-Vehicles, of which the following is a specification.

This invention relates to gearing for motor-vehicles; and it has particular reference to the means for transmitting motion to the wheels, and more particularly to the front wheels, the objects of the invention being to simplify and improve the construction and arrangement, as well as the operation of this class of gearing, to provide for the distribution of power in accordance with the load supported by the wheels, and to improve the front running-gear and the steering mechanism.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a top plan view illustrating the invention as applied to a motor-vehicle, the principal parts constituting the invention being shown in horizontal section. Fig. 2 is a detail front elevation, partly in section, to illustrate the means for connecting the front steering-wheels with the axle. Fig. 3 is a detail side view of the frame structure. Fig. 4 is a perspective detail view of the member supporting the spindle of one of the front or steering wheels.

Corresponding parts in the several figures are indicated throughout by similar characters of reference.

A frame 1 has been shown which may be of any ordinary and well-known construction and which constitutes a portion of the structure of a motor-vehicle having an engine or means of any kind for effecting its propulsion. The sides of the frame are provided with bearings in which the main driven shaft 2 is supported for rotation, said shaft having been illustrated as a crank-shaft, although this is not essential.

Supported for rotation upon the shaft 2 is a sleeve 3, carrying at one end a clutch member 4, adapted to engage a suitably-operated clutch 5, which is feathered upon the shaft and which when thrown into engagement with the clutch member 4 will lock the sleeve 3 upon the shaft for rotation therewith. The sleeve 3 carries a disk or wheel 6, which operates as a balance-wheel and which is provided with a plurality of radial shafts 7, upon each of which there is supported for rotation a pair of bevel-pinions 8 and 9, which are connected by or formed integrally with a sleeve 10, so that the pinions 8 and 9 will rotate simultaneously. Supported for rotation upon the sleeve 3 is a hub 11, carrying two oppositely-facing bevel-gears, one of which, 12, intermeshes with the inner pinions 9, supported by the wheel 6, while the other bevel-gear, 13, serves for the transmission of motion to the front wheels of the vehicle, as will be presently described. Supported for rotation upon the shaft 2, adjacent to, but entirely independent of the sleeve 3, is a hub 14, carrying bevel-gears 15 and 16, the former of which meshes with the bevel-pinions 8, carried by the wheel 6, while the bevel-gear 16 serves for the transmission of power to the rear wheels of the vehicle.

The bevel-gears 13 and 16, respectively, intermesh with bevel-pinions 17 and 18, supported upon shafts 19 and 20, which are journaled in tubular bearings or casings 21 and 22, which have been shown as terminating in collars 23 and 24, which are supported for rotation concentrically with the shaft 2, so that the shafts 19 and 20 may adjust themselves to the motion of the vehicle. To further this object, the said shafts are also provided with universal ball-joints 25 26, which also obviate the necessity of placing the parts that are to be driven in direct alinement with the driving mechanism. The shafts 19 and 20 carry at their outer extremities bevel-pinions 27 and 28, intermeshing with bevel-gears 29 30, which are secured to the two-part front and rear axles 31 and 32 by compensating gearings 33 and 34. The compensating gearings are inclosed by casings 35 and 36, having tubular bearings 37 and 38 for the ends of the shafts 19 and 20, that carry the pinions 27 and 28. Interiorly upon the casings are supported small antifriction-wheels or travelers 38ª, engaging the main wheels of the compensating gearings for the purpose of causing the latter to move steadily and without lateral vibration.

The rear axle 32 is supported for rotation within a tubular casing 39, and the ends of the axle-sections which project beyond the ends of the casing carry the rear wheels 40, which are driven by the mechanism just described.

The members of the front axle 31 are supported for rotation in a tubular casing 41, terminating at the ends thereof in yokes 42, carrying vertically-disposed rods 43, supporting conical bearing members 44, which are held against rotation and vertically adjustable by means of set-screws 45, extending through the lower arms of the yokes. Each of the conical bearings 44 supports a conical shell 46, having at its upper end a neck or sleeve 47, upon which is supported for rotation a bevel-pinion 48, which latter is in mesh with bevel-gears 49 and 50, the former of which is mounted upon the outer end of the proximate section of the axle 41, while the latter is secured upon the hub 51 of one of the front wheels 52, which are journaled upon spindles 51ª, extending outwardly from and supported by the conical shells 46. It follows that the front wheels are driven independently by the sections of the two-part front axle 41, which being driven by the compensating gearing 33 will permit the speed of the wheels to vary when turning curves to compensate for the distances to be traversed by the wheels.

The conical shells 46, which support the front wheels, are provided with radially-extending arms 53, connected by a link-rod 54, so that they may be operated in unison in guiding the vehicle. One of said arms 53 is also connected by a link-rod 55, having a ball-joint 56, with a screw 57 extending through the interiorly-threaded hub 58 of a bevel-pinion 59, said hub being supported for rotation in a suitably-supported bracket 60. The pinion 59 meshes with a bevel-pinion 61 upon the lower end of the shaft 62, extending through a suitably-supported casing 63 and having at its upper end a steering-wheel 64. By manipulating the latter the pinion 59 may be rotated, thus causing the screw 57 to move laterally, and thus turning the supporting members of the wheels 52 in the desired direction to guide the vehicle.

The brackets 42, together with the transmission-gearing for operating the front wheels, are inclosed in casings 65, having slots 66 for the passage of the arms 53 and the spindles 51ª. Suitably supported upon said arms and spindles are shields 67, which are of sufficient size to cover the slots in the various positions which may be assumed by the wheels, and said shields are overhung by guard-flanges 68 to prevent the admission of dust and moisture.

The vehicle-frame is hung upon side springs 69 and 70, supported upon the front and rear axle casings, said springs being connected by links 71 with the front spring 72 and by links 73 with supporting-brackets 74. Lugs 75 upon the under sides of the side members of the frame are connected with the front and rear axles by means of two-part braces 76, having right and left threaded ends that are adjustably connected by right and left threaded nuts or turnbuckles 77. The front and rear axles also support stakes 78, having shoulders 79 to limit the downward movement of the frame as well as to confine the latter against lateral movement.

In the practical operation of this device the various gear-wheels may be made of different relative proportions according to the sizes of the supporting-wheels that are to be driven, to the uses to which the vehicle is to be put, and to the distribution of the load upon the vehicle, such variations being made in order to effect the most advantageous results.

Each of the axles are provided with a brace, as shown at 84 in Fig. 2 of the drawings, said brace being connected with the ends of the axle and with the gear-casing, which latter constitutes a strut for the brace, which thus becomes a truss.

Having thus described the invention, what is claimed is—

1. A two-part axle, compensating gearing for driving the axle-sections, a tubular casing for the axle, yokes at the ends of said casing, rods supported by said yokes, conical bearing members upon said rods, means for adjusting and retaining said bearing members, conical shells supported upon the bearing members and having laterally-extending spindles and upwardly-extending sleeves, bevel-pinions journaled upon the sleeves, bevel-gears secured at the ends of the axle members and meshing with the pinions, wheel-carrying hubs journaled upon the spindles, and bevel-gears upon said hubs meshing with the pinions.

2. The combination of a yoke, a bearing member adjustably mounted in the yoke, a shell engaging the bearing member having a spindle and a steering-arm radiating therefrom, a wheel-carrying hub rotatably mounted on the spindle, a driving-shaft mounted on the yoke, gears on the hub and shaft, a pinion arranged between the gears, and a rod carried by the yoke which holds the bearing member and shell in operative relation and the pinion in mesh with the gears.

3. A pair of adjustable bearing members, vertical rods for supporting the same, shells supported for rotation upon the members and each having a lateral outwardly-extending spindle and a radially-extending arm, a driven axle between the bearing members, wheel-carrying hubs journaled upon the spindles, bevel-gears at the outer ends of the axle and at the inner ends of the hubs, bevel-pinions supported for rotation upon the shells and meshing with the bevel-gears upon the axle and the hubs, a link-rod connecting the radially-extending arms of the shells, and a link-rod connecting one of said arms with a steering-gear.

4. A wheel-carrying member supported for rotation on an approximately vertical axis and having a laterally-extending spindle and a radially-extending steering-arm, a hub supported upon the spindle, gearing for transmitting motion to the hub, a stationary casing having a horizontal slot for the passage of the spindle and the steering-arm, a shield supported by the arm and movably embracing the casing to constitute a closure for the slot, and guard-flanges disposed around the hub and connected with the casing and overhanging the shield.

In testimony that I claim the foregoing as my own I have hereto affixed my signature in the presence of two witnesses.

WILLIAM B. BARD.

Witnesses:
D. L. KAUFMAN,
WM. G. C. SCHAEFFER.